Sept. 28, 1926.

F. H. SLEEPER

CLUTCH

Filed Oct. 4, 1924

Inventor
Frank H. Sleeper
By Attorneys

Patented Sept. 28, 1926.

1,601,001

UNITED STATES PATENT OFFICE.

FRANK H. SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS.

CLUTCH.

Application filed October 4, 1924. Serial No. 741,766.

The principal objects of the invention are to provide a clutch which can be made to gradually pick up to speed without shifting any gears or making any other mechanical connections and yet can be made to connect the driving and driven shafts mechanically and rigidly when at full speed without friction or the generation of heat, and especially to provide such a clutch in a form that will transmit the power at full speed without absorbing any power. Further objects and advantages of the invention will appear hereinafter.

Reference is to be had to the accompanying drawings in which—

Figure 1:
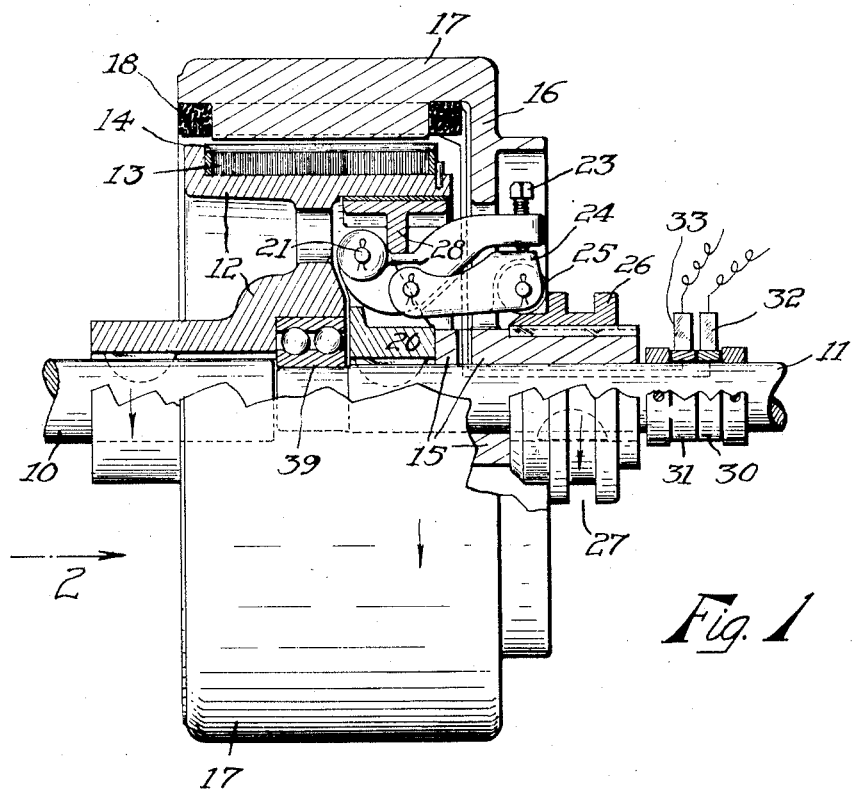
Fig. 1 is a side view partly in central section as indicated by the line 1—1 in Fig. 2, of a clutch constructed in accordance with this invention.

Electromagnetic speed varying devices have been used for several years for the purpose of transmitting power from a driving to a driven shaft. They have certain advantages that are well known, but whenever they drive a driven shaft at less than the maximum speed the efficiency is very low and even at maximum speed it is still too low. Furthermore, they use current all the time while the machine is in operation and the speed of the driven shaft may not be absolutely constant. This invention is designed to avoid these difficulties and yet retain the advantage of these magnetic devices which permits of the gradual picking up of the driven shaft by the driving shaft without complicated and expensive mechanical connections or sudden shift of any kind.

Referring to the drawings it will be seen that I have supplied the driving shaft 10 with magnetic means for driving the driven shaft 11. For this purpose the driving shaft has keyed on it a rotor 12 of the squirrel cage type having sheet metal laminations 13 in such groups as may be desired with copper bars 14 spaced closely on the periphery. This rotor or armature of the electric unit thus provided, of course, rotates at constant speed with the driving shaft 10.

The driven or machine shaft 11 has keyed or otherwise fixed to it a hub 15, which is provided with a flat circular or disc like wall 16 carrying a cylindrical body 17 constituting a housing on the inside of which are mounted the field magnet coils 18. The parts 15, 16 and 17 preferably are cast in one piece, although this is not essential.

The shaft 11 has also keyed on its outer end, or integral with the hub 15 a spider 20 having pairs of radiating ears spaced apart. On each pair of ears is a stud 21 carrying a rocking arm 22. These rocking arms extend substantially parallel with the axis of the shaft and each is provided with an adjusting screw 23 bearing on another rocking arm 24 pivoted on the arm 22 at a point between the stud 21 and the screw 23. This arm 24 carries a roll 25 adapted to be forced out by the axial movement of a shipper collar 26 which is of well-known type having a conical surface for operating the rolls and is slidably keyed on the hub 15. This collar is provided with a groove 27 adapted to be engaged by a lever or the like, not shown, to move it back and forth on the hub 15 which is not longitudinally movable. These rock arms 22 operate an equal number of friction clutch shoes 28, four being indicated, each pivotally mounted on a stud 29 on the wall 16, and each bearing on the inside of the squirrel cage rotor which has an inner cylindrical surface for receiving the shoes 28 against it. When these shoes are forced outwardly they will connect the rotor 12 with the shaft 11 independently of the magnetic device, and when the force is sufficient this will be for all practical purposes a positive or rigid connection.

The shaft 11 has on it two insulated contact rings 30 and 31 provided with brushes 32 and 33 connecting these rings at all times with a rheostat 34 and a circuit 35 supplied with direct current from any desired source. These rings are connected electrically by wires 36 to the field coils 18 in the rotatable housing 17. These coils, as well understood in this art, are connected in series with each other. The shaft 11 is shown as provided with a ball-bearing 39 having its seat in the rotor 12.

Figure 3:
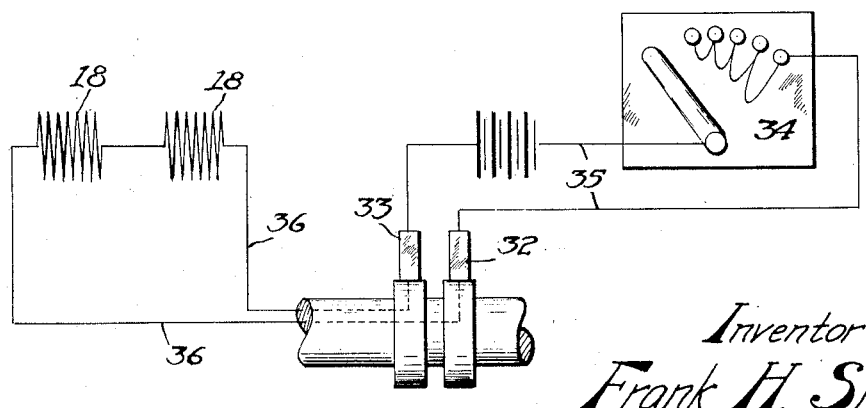
Fig. 3 is a diagrammatic view of the electrical connections.
Figure 2:
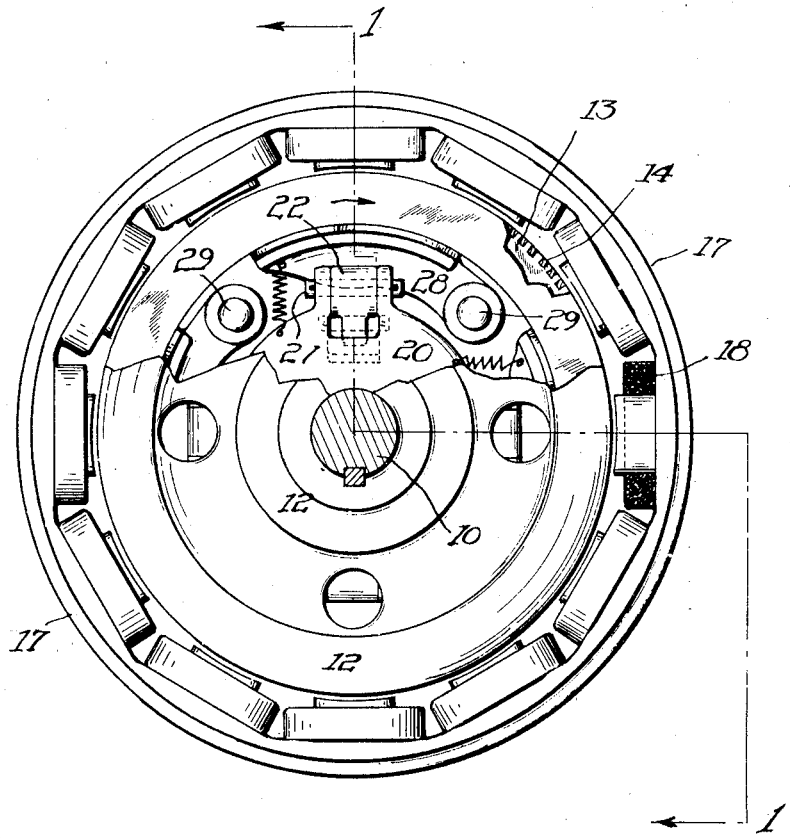
Fig. 2 is an end view looking in the direction of the arrow 2 in Fig. 1 with parts broken away to show parts on the other side.

In the operation of the machine the power shaft 10 is supposed to be rotating at a constant high speed. With the rheostat in the position shown in Fig. 3 and the collar 26 moved to the right of the position shown in Fig. 1 so as not to lift the rolls 25, no power is transmitted to the machine shaft 11. In order to connect the shafts the rheostat is operated to increasingly excite the field coils, it being understood that the lever is turned gradually from one contact to another in series. As soon as the current is connected at all and the field coils commence to receive it, the housing 17 will be forced to rotate by the electromagnetic co-action of the field coils with the armature on the rapidly rotating rotor. But the housing 17 will lag behind the rotor and rotate at a slower speed. As the handle of the rheostat is gradually turned from one contact to another more current is sent through the coils 18 and the more they receive the more rapidly does the housing rotate and, of course, the shaft 11 with it, until finally it will rotate at practically the same speed as the rotor. Now the shipper collar 26 is operated manually or otherwise as may be desired to the left to throw outwardly the rolls 25 and cause the levers 24 to engage the screws 23 and shift the rock arms 22 outwardly all to the same degree. This applies the shoes 28 to the inner surface of the rotor. Both the shoes and the rotor rotating at the same speed, the connection is made without material wear or the generation of any appreciable amount of friction or heat. In other words, there is very little slip as two parts are clutched together by these shoes while they are rotating at approximately the same speed. This makes a rigid mechanical connection between the two shafts and thereafter as long as the shaft 11 is to be driven at full speed there is no need of using the electrical current for the magnetic coils and that can be turned off. If it is desired to stop the shaft 11 all that is necessary now is to draw out the clutch collar 26.

By this arrangement it will be seen that all the advantages of the ordinary magnetic "clutch" are retained and that the driving of the driven shaft is accomplished after it is once up to speed with no loss of power whatever. The mechanical clutch is set into action without the generation of heat or the grinding of one metallic surface against another. The machine does not require the use of any electric current while the driven shaft is being operated at full speed and that much saving is secured. It forms a perfect means for bringing the driven shaft up to speed without the employment of mechanical connections, the shifting of gears or the bringing into contact of two surfaces moving at different speeds, and is operable at full efficiency after it once gets up to full speed.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described.

What I do claim is:

1. Means for operatively connecting a driving shaft to a driven shaft, comprising a magnetic rotor secured to one of said shafts, an electro-magnetic member having a housing surrounding said rotor, secured to the other shaft, the inside cylindrical surface of said rotor constituting one member of a friction clutch, a plurality of shoes, constituting the other member of said clutch, pivoted on said housing member, levers also pivoted on said housing member, and means for rocking said levers to force said shoes against said surface.

2. Means for operatively connecting a driving shaft to a driven shaft, comprising a magnetic rotor secured to one of said shafts, an electro-magnetic member, having a housing surrounding said rotor, secured to the other shaft, the inside cylindrical surface of said rotor constituting one member of a friction clutch, a plurality of shoes constituting the other member of said clutch, pivoted on said housing member, a plurality of rocking arms pivoted on said housing member and extending substantially parallel with its shaft, another rocking arm pivoted on each of said first mentioned arms, a set screw carried by each of the latter and bearing on the other rocking arm, and means slidable on the shaft, carrying said housing member, for engaging said last mentioned arms to cause said shoes to engage said surface.

In testimony whereof I have hereunto affixed my signature.

FRANK H. SLEEPER.